United States Patent
Matsubayashi et al.

(10) Patent No.: US 9,754,417 B2
(45) Date of Patent: Sep. 5, 2017

(54) METHODS AND SYSTEMS FOR DISPLAYING VIRTUAL OBJECTS

(71) Applicants: Canon Information and Imaging Solutions, Inc., Melville, NY (US); Canon U.S.A., Inc., Melville, NY (US)

(72) Inventors: Don Hideyasu Matsubayashi, Tustin, CA (US); Masaharu Enomoto, Irvine, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 114 days.

(21) Appl. No.: 14/588,208

(22) Filed: Dec. 31, 2014

(65) Prior Publication Data

US 2016/0189428 A1 Jun. 30, 2016

(51) Int. Cl.
  *G09G 5/00* (2006.01)
  *G06T 19/00* (2011.01)
  *G02B 27/01* (2006.01)

(52) U.S. Cl.
  CPC .......... *G06T 19/006* (2013.01); *G02B 27/017* (2013.01); *G02B 27/0172* (2013.01); *G02B 2027/014* (2013.01); *G02B 2027/0138* (2013.01); *G02B 2027/0178* (2013.01); *G02B 2027/0187* (2013.01)

(58) Field of Classification Search
  CPC ............................. G06T 19/006; G06T 19/00
  USPC ....................................................... 345/633
  See application file for complete search history.

(56) References Cited

U.S. PATENT DOCUMENTS

2002/0021297 A1* 2/2002 Weaver .................. A41H 3/007
                                                              345/420
2006/0079324 A1* 4/2006 Watanabe ............... A63F 13/10
                                                              463/30

(Continued)

OTHER PUBLICATIONS

Billinghurst, M., Poupyrev, I., Kato, H., May, R. Mixing Realities in Shared Space: An Augmented Reality Interface for Collaborative Computing. In Proceedings of the IEEE International Conference on Multimedia and Expo (ICME2000), Jul. 30-Aug. 2, New York.*

(Continued)

*Primary Examiner* — Jin Ge
(74) *Attorney, Agent, or Firm* — Canon U.S.A., Inc. IP Division

(57) ABSTRACT

Methods and systems for displaying a virtual object capture, via an image capturing device, images of a physical scene that includes a first marker and a second marker, wherein the first marker and the second marker are physical markers; associate a first virtual object with the first marker and a second virtual object with the second marker; track the position of the first marker and the position of the second marker in the captured images of the physical scene using a tracking device; detect an interaction between the first marker and the second marker based on the tracked position of the first marker and the tracked position of the second marker, wherein the interaction is detected when the first marker and the second marker are within a predetermined proximity of each other; and associate, in response to detecting that the interaction, a third virtual object with the first marker.

14 Claims, 11 Drawing Sheets

(56) References Cited

U.S. PATENT DOCUMENTS

| | | | | |
|---|---|---|---|---|
| 2007/0038944 | A1* | 2/2007 | Carignano | G06T 15/20 715/757 |
| 2010/0218298 | A1* | 9/2010 | Stattelmann | A41D 13/0015 2/69 |
| 2012/0108332 | A1* | 5/2012 | Baseley | A63F 13/06 463/31 |
| 2012/0268493 | A1* | 10/2012 | Hayakawa | A63F 13/06 345/633 |
| 2014/0253591 | A1* | 9/2014 | Hayakawa | G06T 19/006 345/633 |
| 2015/0130790 | A1* | 5/2015 | Vasquez, II | G06T 19/006 345/419 |

OTHER PUBLICATIONS

Kato, H., Billinghurst, M., Poupyrev, I., Imamoto, K., Tachibana, K. (2000) Virtual Object Manipulation on a Table-Top AR Environment. In proceedings of the International Symposium on Augmented Reality, pp. 111-119, (ISAR 2000), Munich, Germany.

IPLNAISTMovies. (Jan. 27, 2010) Semi-transparent two-dimensional color markers that can be superposition. <https://www.youtube.com/watch?v=69o4hEcMPUQ>.

Uranishi, Yuki. Marker-based Augmented Reality. Bioimaging Laboratory, Department of Mechanical Science and Bioengineering, Graduate School of Engineering Science, Osaka University, Japan. <http://oshiro.bpe.es.osaka-u.ac.jp/people/staff/uranishi/research/research-j.html>.

\* cited by examiner

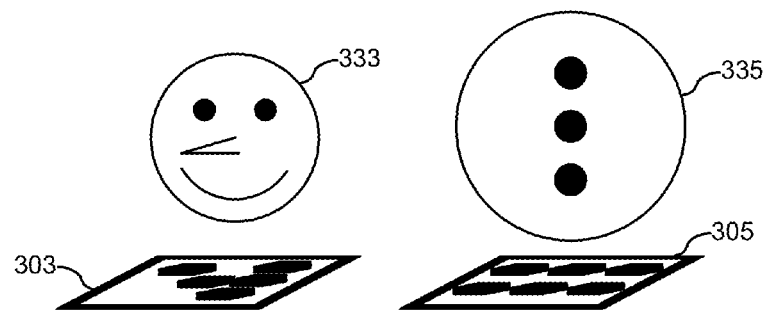
FIG. 3A
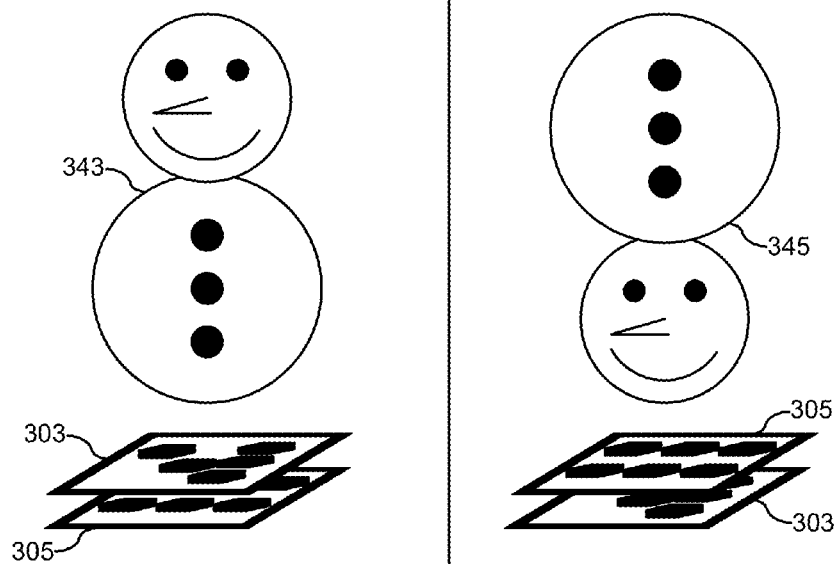
FIG. 3B
FIG. 3C

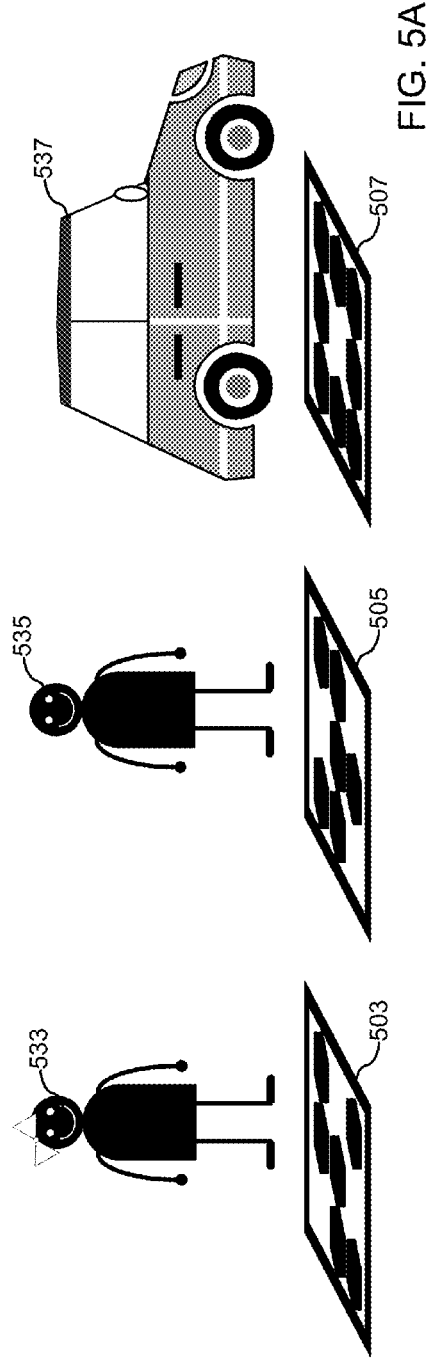
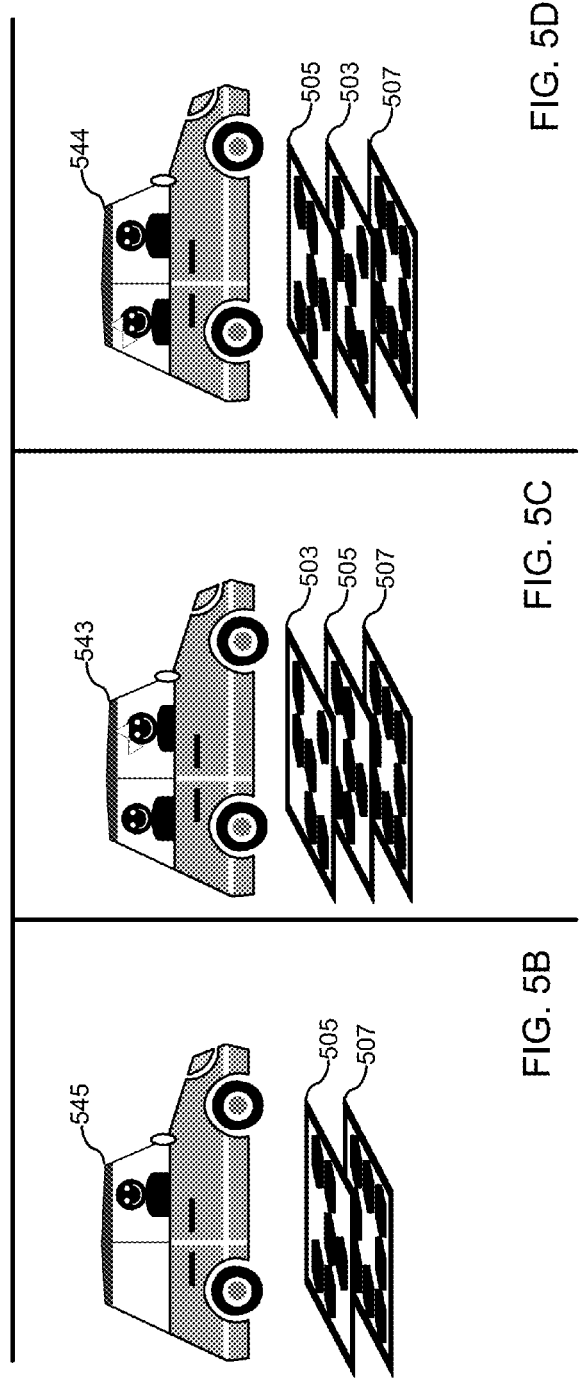

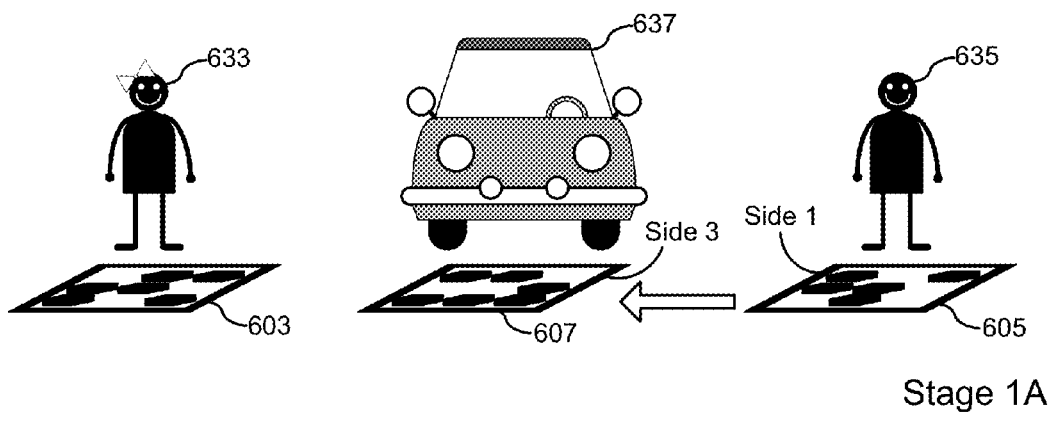
Stage 1A
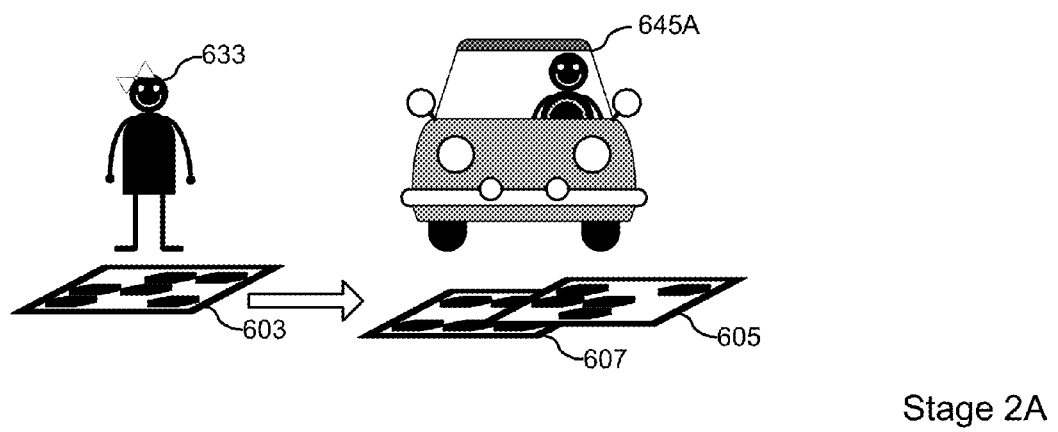
Stage 2A
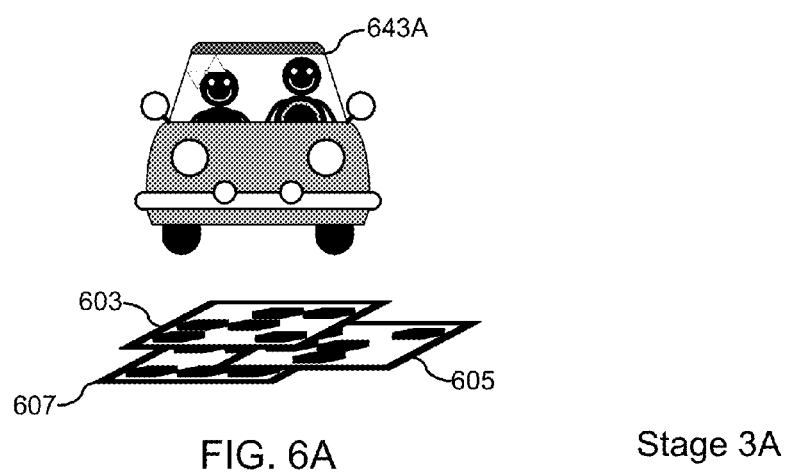
FIG. 6A
Stage 3A

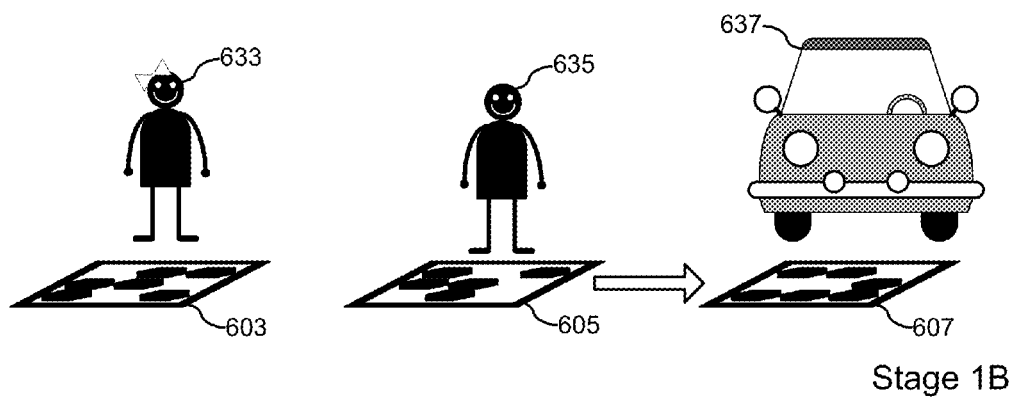
Stage 1B
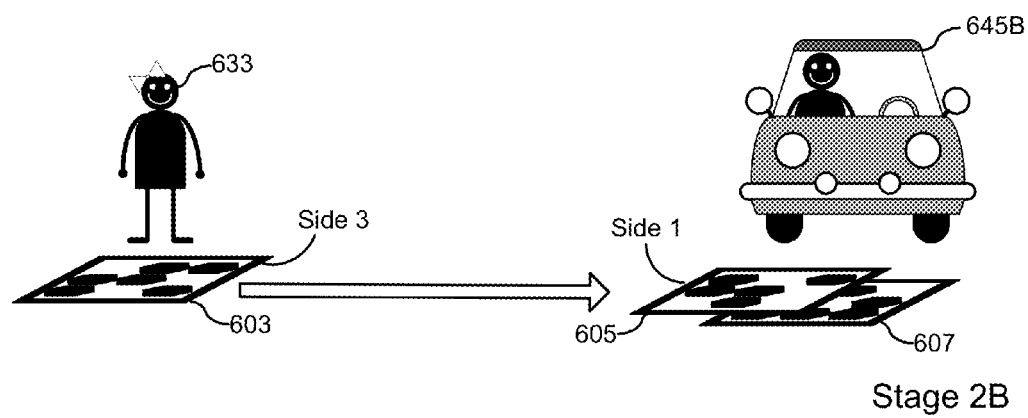
Stage 2B
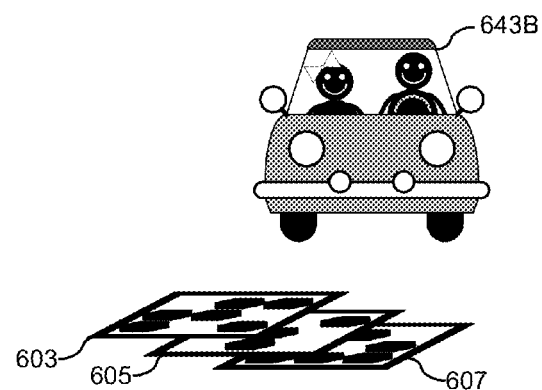
FIG. 6B
Stage 3B

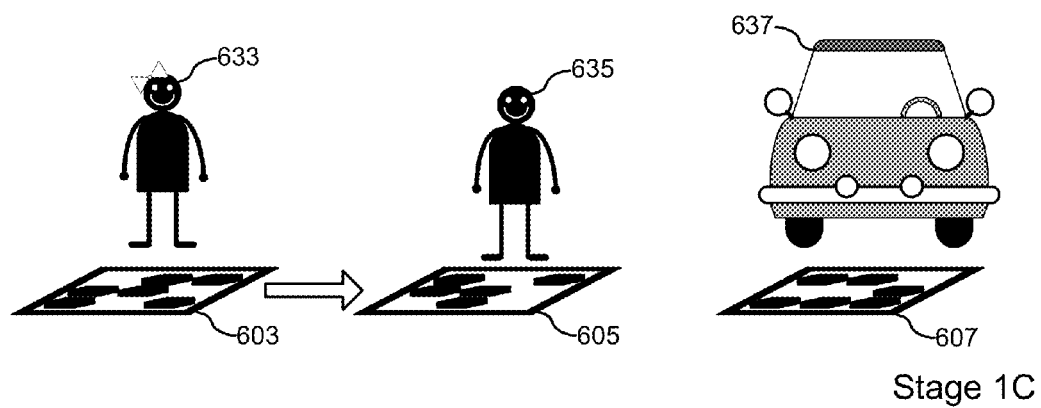
Stage 1C
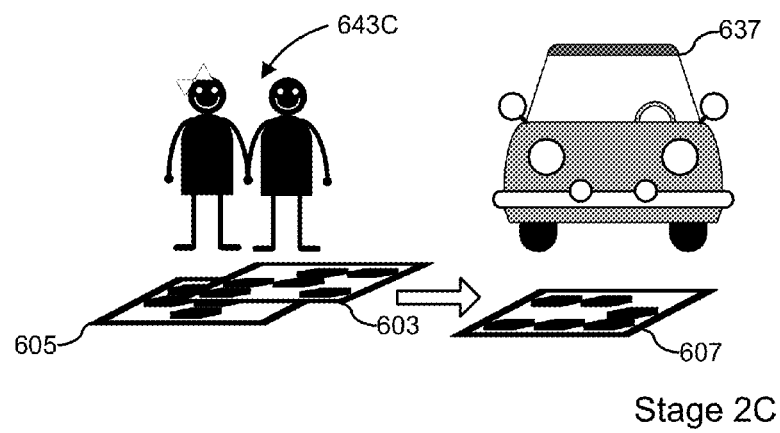
Stage 2C
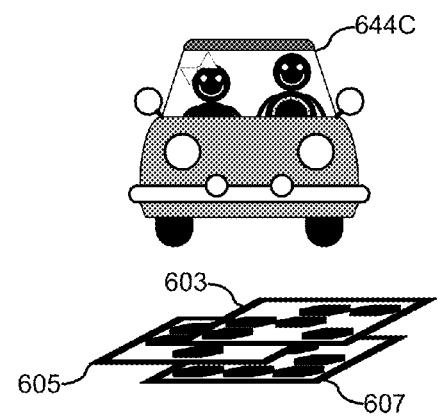
Stage 3C
FIG. 6C

METHODS AND SYSTEMS FOR DISPLAYING VIRTUAL OBJECTS

BACKGROUND

Field of the Disclosure

The present disclosure relates generally to displaying virtual objects.

Background

In mixed reality, a physical marker is often associated with a virtual object. The position of the physical marker may be tracked using computer vision, so that when the user moves the marker across a table, for example, the associated virtual object can be seen moving across the table along with the movement of the marker. However, with computer-vision-based marker tracking, when the marker is obscured by a physical object (e.g., another marker, the user's hand, etc.), the marker can no longer be tracked, and thus, the associated virtual object disappears from the view of the user or remains stationary at the last known position of the marker. As such, interactions that would be natural to do with physical markers, such as stacking markers one on top of another, leads to undesirable results when these markers have virtual objects associated with them. Accordingly, this creates a poor user experience.

SUMMARY

In one embodiment, a method for displaying a virtual object comprises capturing, via an image-capturing device, images of a physical scene that includes a first marker and a second marker, wherein the first marker and the second marker are physical markers; associating a first virtual object with the first marker and a second virtual object with the second marker; tracking the position of the first marker and the position of the second marker in the captured images of the physical scene using a tracking device; detecting an interaction between the first marker and the second marker based on the tracked position of the first marker and the tracked position of the second marker, wherein the interaction is detected when the first marker and the second marker are within a predetermined proximity of each other; and associating, in response to detecting the interaction, a third virtual object with the first marker.

In one embodiment, a method for displaying a plurality of virtual objects comprises capturing, via an image capturing device, images of a physical scene that includes one or more of a first marker and a second marker in predefined positions, wherein the first marker and the second marker are physical markers, and wherein a first virtual object is associated with the one or more of the first marker and the second marker; tracking positions of the one or more of the first marker and the second marker using a tracking device; detecting movement of one or more of the first marker and the second marker to different positions than the predefined positions; and disassociating the first virtual object from the one or more of the first marker and the second marker in response to detecting the movement of the one or more of the first marker and the second marker to the different positions than the predefined positions.

In one embodiment, a system comprises one or more computer-readable media; and one more processors that are coupled to the computer-readable media and that are configured to cause the system to capture images of a physical scene that includes a first marker and a second marker, wherein the first marker and the second marker are physical markers, generate a first virtual object, a second virtual object, a third virtual object, and a fourth virtual object, associate the first virtual object with the first marker and the second virtual object with the second marker, track the position of the first marker and the position of the second marker in the captured images of the physical scene, detect an interaction between the first marker and the second marker based on the tracked position of the first marker and the tracked position of the second marker, and, in response to detecting the interaction, associate the third virtual object or the fourth virtual object with the first marker.

BRIEF DESCRIPTION OF THE DRAWINGS

FIGS. 3A-C illustrate example embodiments of displaying a virtual object.

FIGS. 5A-D illustrates example embodiments of displaying a virtual object.

FIGS. 6A-C illustrate example embodiments of displaying a virtual object.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1A:
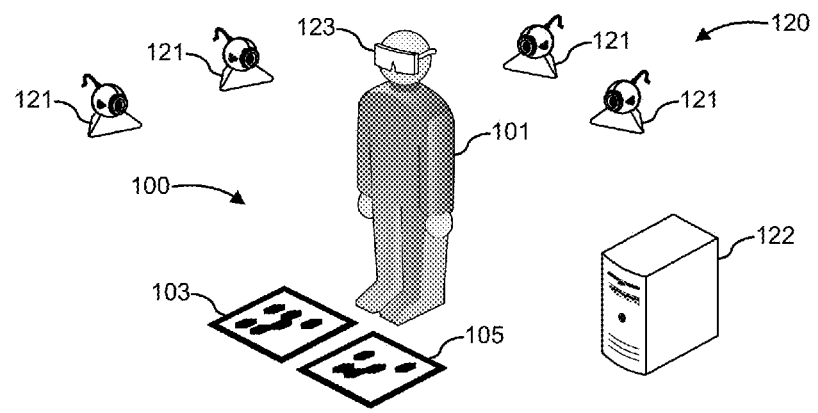
FIGS. 1A-C illustrate example embodiments of a physical scene, an enhanced scene, a further-enhanced scene, and a system for generating an enhanced scene and a further-enhanced scene.
Figure 1B:
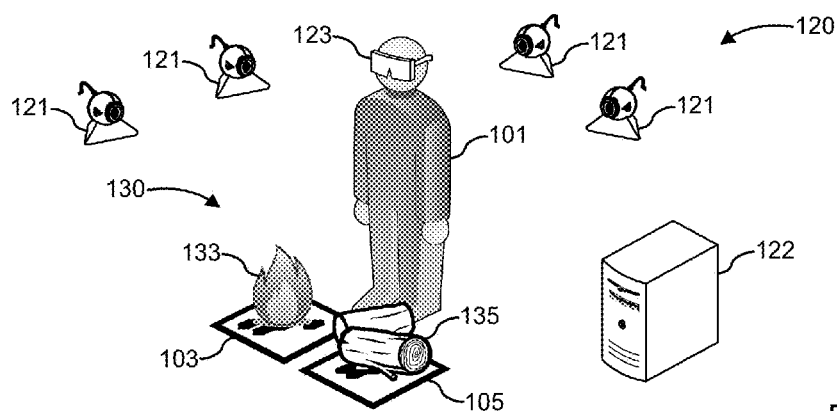
Figure 1C:
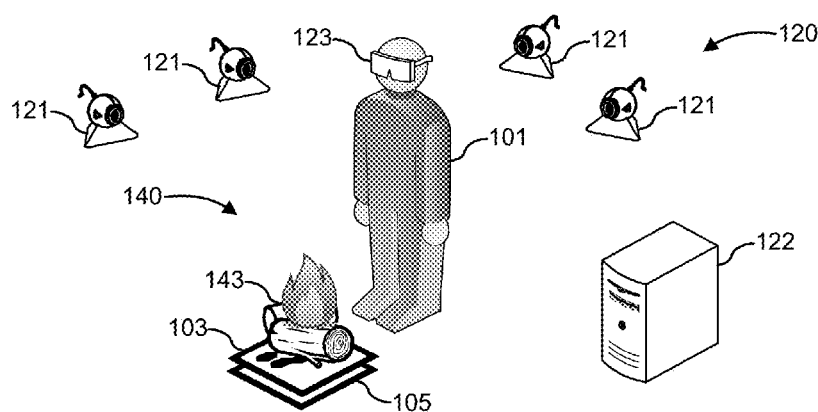

FIGS. 1A-C illustrate example embodiments of a physical scene, an enhanced scene, a further-enhanced scene, and a system for generating an enhanced scene and a further-enhanced scene. The physical scene 100 includes a first physical marker 103 and a second physical marker 105. The system 120 includes one or more tracking cameras 121, one or more image-enhancing devices 122, and an image-display device 123.

The system 120 captures images of the physical scene 100 using the tracking cameras 121, adds images of a first virtual scene, which includes a first virtual object 133 and a second virtual object 135, to the captured images of the physical scene 100, generates an enhanced scene 130 based on the captured images of the physical scene 100 and the first virtual scene using the image-enhancing devices 122, and sends images of the enhanced scene 130 to the image-display device 123 to be displayed to the observer 101 via a display device of the image-display device 123.

If an interaction between the physical marker 103 and the physical marker 105 is detected, the system 120 adds images of the second virtual scene, which includes a third virtual object 143, to the physical scene 100; generates a further-enhanced scene 140 based on the captured images of the physical scene 100 and the second virtual scene using the image-enhancing devices 122; and sends images of the further-enhanced scene 140 to the image-display device 123 to be displayed to the observer 101 via a display device of the image-display device 123. The third virtual object 143 may be a mixture of the first virtual object 133 and the second virtual object 135. In this embodiment, the system 120 stops sending the images of the enhanced scene 130 before the system 120 starts sending the images of the further-enhanced scene 140.

The images of the enhanced scene 130 and the images of the further-enhanced scene 140 may include computer graphics drawn on top of images of the physical scene 100. The system 120 may also include arbitrarily masked areas in the images, enabling the computer graphics to be drawn behind physical elements within the physical scene 100 when generating images of an enhanced scene 130 and images of a further-enhanced scene 140. Therefore, the system 120 allows areas of images of the physical scene 100 to be overwritten with images of a virtual scene.

The first physical marker 103 and the second physical marker 105 may each be a fiducial marker, a magnetic marker, a reflective marker, or a combination of any of the aforementioned types of markers. In some embodiments, the physical marker 103 and the second physical marker 105 each is a markerless physical object. Yet, in some other embodiments, either of the physical marker 103 and the second physical marker 105 is a markerless physical object, and the other is any one of the above-mentioned marker type. The physical scene 100 may include more than two physical markers. Additionally, a physical marker (e.g., the first physical marker 103 or the second physical marker 105) may be associated with one or more virtual objects (e.g., the first virtual object 133 or the second virtual object 135).

The tracking cameras 121 capture images of the observer 101, the first physical marker 103, the second physical marker 105, and the image-display device 123. The images captured by the tracking cameras 121 are sent to the image-enhancing device 122.

The image-enhancing device 122 includes one or more computing devices (e.g., desktop computers, laptop computers, computer servers, tablet computers, smartphones). The image-enhancing device 122 receives the images of the physical scene 100 that were captured by the tracking cameras 121, creates a virtual scene (e.g., virtual objects), adds images of the virtual scene to the physical scene 100, creates an enhanced scene 130 or a further-enhanced scene 140 based on the physical scene 100 and the virtual scene, and sends the images of the enhanced scene 130 or the further-enhanced scene 140 to the image-display device 123. Further, the image-enhancing device 122 may communicate with the tracking cameras 121 and the image-display device 123 via wireless or wired connections (not shown).

The image-display device 123 is a head-mounted display device and is worn on the head of the observer 101. In some embodiments, the image-display device 123 is a different type of wearable display device (e.g., a smart watch) or handheld display device (e.g., a tablet computer, a personal digital assistant). The image-display device 123 includes one or more cameras and one or more display devices. The one or more cameras of the image-display device 123 capture images (e.g., still photos, videos) of the physical scene 100 in the same or similar manner as the tracking cameras 121. Additionally, the image-display device 123 may include a tracking marker so that the position and orientation of the image-display device 123 can be easily tracked. In some embodiments, the position and orientation of the image-display device 123 may be tracked using the images that were captured by the tracking cameras 121 or the one or more cameras of the image-display device 123.

In some embodiments, the image-display device 123 does not include the one or more cameras. In such a case, the system utilizes the images from the tracking cameras 121. In some other embodiments, the system 120 may not include the tracking cameras 121. The images from the one or more cameras on the image-display device 123 are provided to the system 120.

In FIG. 1A, the observer 101 sees images of the physical scene 100. For example, the system 120 displays images of the physical scene 100, which includes the first physical marker 103 and the second physical marker 105, without adding images of a virtual scene to the images of the physical scene 100 on the display device of the image-display device 123.

In FIG. 1B, the observer 101 sees images of the enhanced scene 130. The system 120 generates the enhanced scene 130 based on images of the physical scene 100 and the first virtual scene. The first virtual scene includes a virtual object 133 (i.e., a flame in this example) and a virtual object 135 (i.e., fire logs in this example). The first virtual scene may be pre-registered to the system 120. When generating the enhanced scene 130, the system 120 associates the first virtual object 133 in the first virtual scene with the first physical marker 103 in the physical scene 100 and associates the second virtual object 135 in the first virtual scene with the second physical marker 105 in the physical scene 100. The virtual objects 133 and 135 are associated with the respective physical markers 103 and 105 so that the first virtual object 133 appears on top of the first physical marker 103 and the second virtual object 135 appears on top of the second physical marker 105 in the enhanced scene 130, which will be displayed on the display device of the image-display device 123 worn by the observer 101. Thus, the observer 101 sees a flame and fire logs.

In FIG. 1C, the observer 101 sees images of the further-enhanced scene 140. In this embodiment, the system 120 detects an interaction between the first physical marker 103 and the second physical marker 105 when the first physical marker 103 is overlaid on the second physical marker 105 based on the images sent from the tracking cameras 121. If an interaction is detected, the system generates a further-enhanced scene based on the second virtual scene, which includes a third virtual object 143 (i.e., burning fire logs in this example), and on the physical scene 100 in which the first physical marker 103 is placed on top of the second physical marker 105. The system 120 stops feeding the images of the enhanced scene 130 and starts sending the images of the further-enhanced scene 140 to the image-display device 123. Thus, the observer 101 sees burning fire logs (i.e., the third virtual object 143 in this example) instead of a flame (i.e., the first virtual object 133 in this example) and fire logs (i.e., the second virtual object 135 in this example).

The system 120 uses the images from the tracking cameras 121, the one or more cameras of the image-display device 123, or both, to identify at least one or more of the following: the position of the observer 101, the movements of the observer 101, the positions of the first physical marker 103 and the second physical marker 105, the movements of the first physical marker 103 and the second physical marker 105, the position of the image-display device 123, and the movements of the image-display device 123.

The system 120 may map the position and orientation of the first physical marker 103 and the second physical marker 105 in a physical scene 100 and the position and orientation of the image-display device 123 in the physical scene 100 to a world-coordinate space based on the images of the physical scene 100 that were captured by the tracking cameras 121, the one or more cameras of the image-display device 123, or both. The system 120 may further map the positions and orientations of virtual objects in a virtual scene (e.g., computer-generated scenery) and the positions and orientations of the virtual objects in an enhanced scene 130 (or in the further-enhanced scene 140) to the world-coordinate space so that the physical scene 100, the virtual scene, and the enhanced scene 130 (or the further-enhanced scene 140) may be defined in common coordinates using the world-coordinate space.

Figure 2:
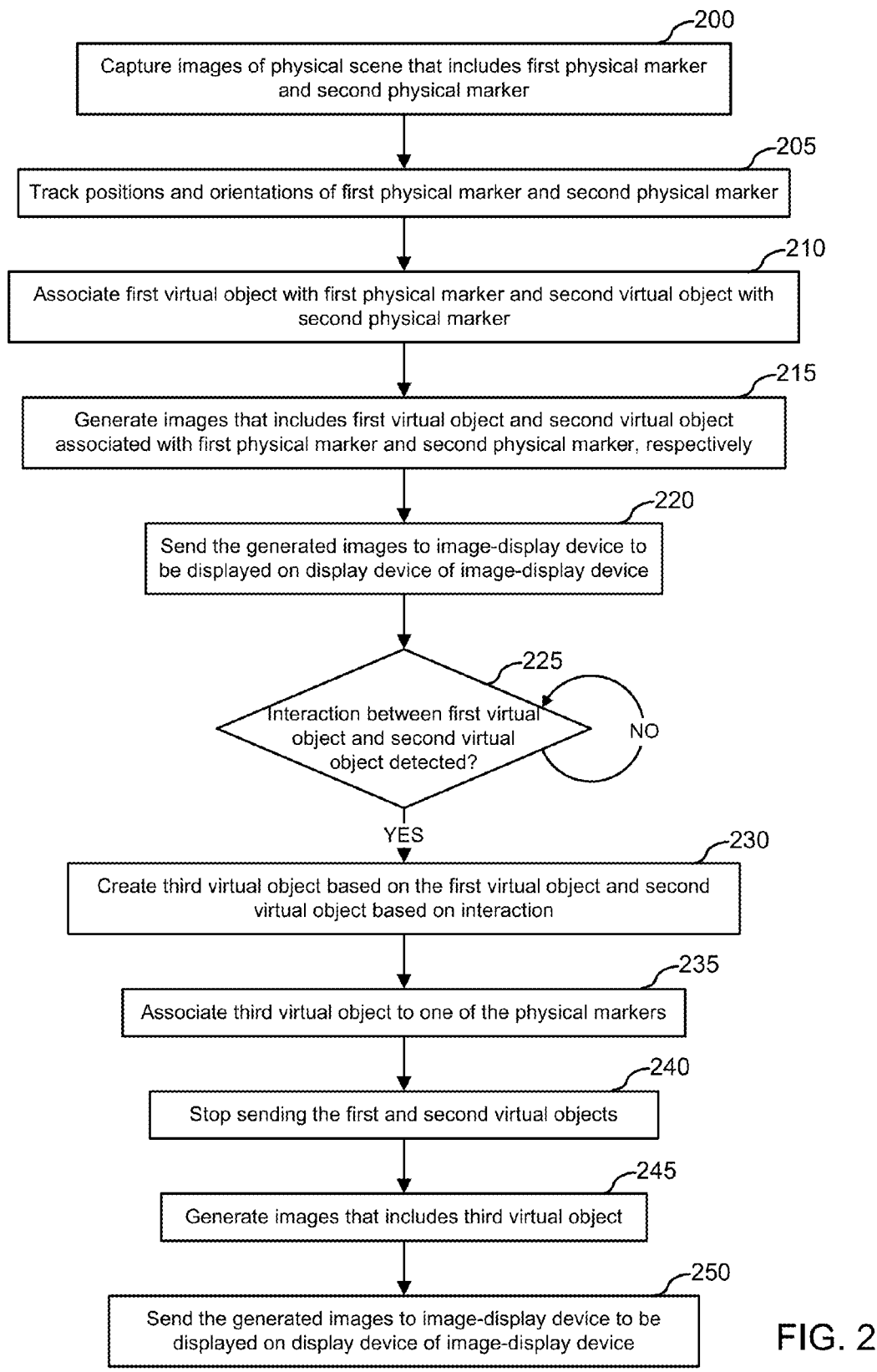
FIG. 2 is a flowchart illustrating an example embodiment of a method for displaying a virtual object.

FIG. 2 is a flowchart illustrating an example embodiment of a method for displaying a virtual object. The blocks of this method and the other methods described herein may be performed by one or more computing devices, for example the systems and devices described herein. Also, although this method and the other methods described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this method and the other methods described herein may omit blocks, add blocks, change the order of the blocks, combine blocks, or divide blocks into more blocks.

Beginning in block 200, images of a physical scene that includes a first physical marker and a second physical marker are captured using one or more tracking cameras. In some embodiments, the physical scene includes more than two physical markers. Next, in block 205, the positions and orientations of the first physical marker and the second physical marker are tracked based on the images of the physical scene. Then, in block 210, a first virtual object is associated with the first physical marker and a second virtual object is associated with the second physical marker. In block 215, images of the first virtual object appearing on top of the first physical marker and of the second virtual object appearing on top of the second physical marker are generated. Then, in block 220, the generated images are sent to an image-display device and displayed on the display device of the image-display device.

In block 225, whether an interaction between the first virtual object and the second virtual object is detected is determined. The system may detect the interaction between the virtual objects by tracking the physical markers that are associated with the respective virtual objects. For example, if the physical markers are placed within a predetermined proximity (e.g., within 1 centimeter) of each other for a predetermined period of time (e.g., 0.5 seconds), the system may detect an interaction between the virtual objects. In some embodiments, if one of the physical markers covers a part of or the entire surface of the other physical marker (e.g., one physical marker partly or completely overlays the other physical marker) for a certain period of time (e.g., 0.7 seconds), the system detects an interaction between the virtual objects.

If an interaction between the first virtual object and the second virtual object is detected (block 225=YES), the flow proceeds to block 230. Otherwise, if an interaction between the virtual objects is not detected (block 225=NO), the flow repeats block 225.

In block 230, a third virtual object is created based on the interaction of the first virtual object and second virtual object. Next, in block 235, a third virtual object is associated with the first physical marker. In some embodiments, the third virtual object is associated with the second physical marker. The system may arbitrarily determine which physical marker to associate the third virtual object with. For example, the system may select a physical marker to associate based on the visibilities of the physical markers after an interaction is detected or based on the pre-registered information of the physical markers.

In block 240, the sending of the images of the first virtual object appearing on top of the first physical marker and the second virtual object appearing on top of the second physical marker to the image-display device is stopped. Moving onto block 245, images of the third virtual object appearing on top of the physical associated with the third virtual object are generated. In block 250, the generated images of the third virtual object are sent to the image-display device to be displayed on the display device of the image-display device.

FIGS. 3A-3C illustrate example embodiments of displaying a virtual object. In FIG. 3A, an enhanced scene is illustrated. The enhanced scene includes a first virtual object 333, which illustrates a snowman's head, and a second virtual object 335, which illustrates a snowman's body. Further, the first virtual object 333 is associated with a first physical marker 303 and the image of the first virtual object 333 is superimposed on the physical marker 303, and a second virtual object 335 is associated with a second physical marker 305 and the image of the second virtual object 335 is superimposed on the physical marker 305. Thus, images of a snowman's head appearing on top of the first physical marker 303 and a snowman's body appearing on top of the second physical marker 305 are displayed to the observer via an image-display device. If the system detects an interaction between the first virtual object 333 and the second virtual object 335 (i.e., an interaction between the physical marker 303 and the physical marker 305), a further-enhanced scene is displayed as illustrated in FIG. 3B and FIG. 3C.

In FIG. 3B, an interaction between the first physical marker 303 and the second physical marker 305 is detected when the first physical marker 303 is overlaid on the second physical marker 305. In this embodiment, when the first physical marker 303 is overlaid on the second physical marker 305, the first physical marker 303 completely covers the visible surface (e.g., the surface visible from the tracking cameras, the camera of the image-display device, or both) of the second physical marker 305. The interaction may be detected after the first physical marker 303 is overlaid on the second physical marker 305 for a predetermined period of time. In some embodiments, an interaction is detected when the first physical marker 303 only covers at least a part of the second physical marker 305. Yet, in some other embodiments, an interaction is detected when the first physical marker 303 and the second physical marker 305 are within a predetermined proximity of each other (e.g., within 3 centimeters of the edges of each of the physical markers). When the interaction is detected, a third virtual object 343, which illustrates a snowman with its head on top of its body, is created. Then, the third virtual object 343 is associated with the first physical marker 303, which is on top of the second physical marker 305 and is visible from the tracking cameras. In some embodiments, where the interaction is detected when the first physical marker 303 and the second physical marker 305 are within a predetermined proximity of each other, the system may arbitrarily select the physical marker to associate with the third virtual object 343.

The sending of the images of the first virtual object 333 displayed on top of the first physical marker 303 and the second virtual object 335 displayed on the second physical marker 305 is stopped. Then, images of the third virtual object 343, which is displayed on top of the first physical marker 303, which is placed on top of the second physical marker 305, are sent to an image-display device. Thus, the observer sees a snowman with its head on top of its body.

In FIG. 3C, an interaction between the first physical marker 303 and the second physical marker 305 is detected when the second physical marker 305 is overlaid on the first physical marker 303. In this embodiment, when the second physical marker 305 is overlaid on the first physical marker 303, the second physical marker 305 completely covers the visible surface (e.g., the surface visible from the tracking cameras, the camera of the image-display device, or both) of the first physical marker 303. The interaction may be detected after the second physical marker 305 is overlaid on the first physical marker 303 for a predetermined period of time. In some embodiments, an interaction is detected when the second physical marker 305 only covers a part of the first physical marker 303. Yet, in some other embodiments, an interaction is detected when the first physical marker 303 and the second physical marker 305 are within a predetermined proximity of each other (e.g., within 5 centimeters of each other). When the interaction is detected, a third virtual object 345, which illustrates a snowman with its body on top of its head, is created. Then, the third virtual object 345 is associated with the second physical marker 305, which is on top of the first physical marker 303 and is visible from the tracking cameras. In the embodiments in which the interaction is detected when the first physical marker 303 and the second physical marker 305 are within a predetermined proximity each other, the system may arbitrarily select the physical marker to associate with the third virtual object 345.

The sending of the images of the first virtual object 333 displayed on top of the first physical marker 303 and the second virtual object 335 displayed on the second physical marker 305 is stopped. Then, images of the third virtual object 345, which is displayed on top of the second physical marker 305, are sent to an image-display device. Thus, the observer sees a snowman with its body on top of its head via the image-display device.

Figure 4A:
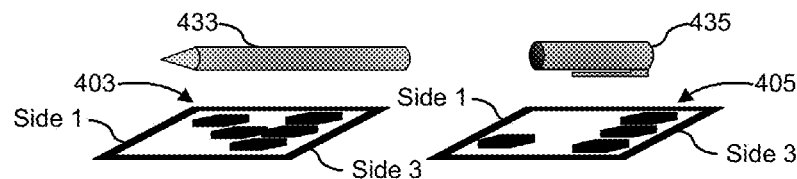
FIGS. 4A-F illustrate example embodiments of displaying a virtual object based on an interaction.

FIGS. 4A-F illustrate example embodiments of displaying a virtual object based on an interaction. In FIG. 4A, a first virtual object 433, which depicts a pen, is associated with a first physical marker 403, and a second virtual object 435, which depicts a pen cap, is associated with a second physical marker 405. In this embodiment, in addition to the positions of the first physical marker 403 and the second physical marker 405, the orientations of the first physical marker 403 and the second physical marker 405 are tracked. The first virtual object 433 is associated with the first physical marker 403 so that the orientation of the first virtual object 433 is also associated with the orientation of the first physical marker 403, and the second virtual object 435 is associated with the second physical marker 405 so that the orientation of the second virtual object 435 is associated with the second physical marker 405. For example, the orientation of the first virtual object 433 is associated with the orientation of the first physical marker 403 so that the tip of the pen corresponds to Side 1 of the first physical marker 403 and the end of the pen corresponds to Side 3 of the first physical marker 403. Thus, images of first the virtual object 433 on top of the first physical marker 403 and the second virtual object 435 on top of the second physical marker 405 as illustrated in FIG. 4A are displayed on an image-display device worn by the observer.

Figure 4B:
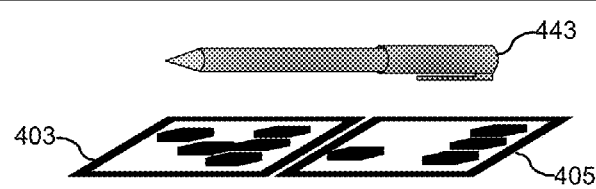

In FIG. 4B, an interaction between the first physical marker 403 and the second physical marker 405 is detected when the first physical marker 403 and the second physical marker 405 are placed within a predetermined distance (e.g., 1 centimeter) of each other for a predetermined period of time (e.g., 0.3 seconds). The orientations of the first physical marker 403 and the second physical marker 405 are also determined. When an interaction is detected and the orientations are determined, a third virtual object 443, which depicts a pen cap posted on the end of the pen, is created. The third virtual object 443 is then associated with the first physical marker 403. In this embodiment, the first physical marker 403 had been previously selected to be associated with the third virtual object 443. The observer or administrator of the system may pre-set which physical marker is to be associated with a virtual object after the interaction is detected. The first virtual object 433 and the second virtual object 435 become non-visible to the observer after the third virtual object 443 is associated with the first physical marker 403. Then, images of the third virtual object 443 superimposed on the first physical marker 403 are displayed to the observer. In some embodiments, the third virtual object 443 may appear directly on top of the second physical marker 405, which the third virtual object 443 is not associated with, or on top of where the first physical marker 403 and the second physical marker 405 comes closest to each other (e.g., Side 3 of the first physical marker 403 and Side 1 of the physical marker 405).

Figure 4C:
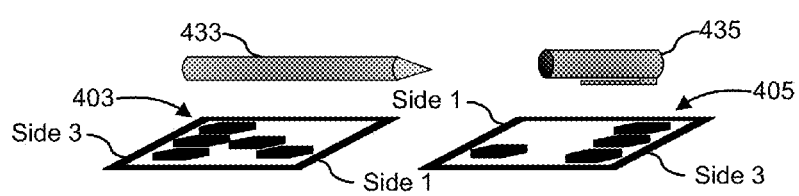

In FIG. 4C, the first physical marker 403 is rotated 180 degrees from the position the first physical marker is in FIGS. 4A and 4B so that Side 1 of the first physical marker 403 is now facing the second physical marker 405. The second physical marker 405 stays in the same position as the second physical marker 405 is in FIGS. 4A and 4B. The first virtual object 433 is rotated 180 degrees along with the rotation of the first physical marker 403. Consequently, the tip of the pen is now facing the cap of the pen (i.e., the second virtual object 435). Thus, images of the first virtual object 433, which is rotated 180 degrees and appears on top of the first physical marker 403, and of the second virtual object 435, which appears on top of the second physical marker 405, as illustrated in FIG. 4C are displayed on an image-display device worn by the observer.

Figure 4D:
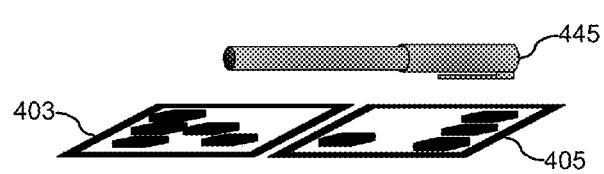

In FIG. 4D, an interaction between the first physical marker 403 and the second physical marker 405 is detected when the first physical marker 403 and the second physical marker 405 are placed within a predetermined distance (e.g., 0.5 centimeter) of each other for a predetermined period of time (e.g., 0.4 seconds). The orientations of the first physical marker 403 and the second physical marker 405 are also determined. In this embodiment, when an interaction is detected and the orientations are determined, a fourth virtual object 445, which depicts a pen closed off with its cap, is created. The system may determine which virtual object to create based on the orientations the first physical marker 403 and the second physical marker 405 or on the orientations of the first virtual object 433 and the second virtual object 435. The fourth virtual object 445 is then associated with the second physical marker 405. In this embodiment, the system arbitrarily selected the second physical marker 405 to be associated with the fourth virtual object 445. Then, the fourth virtual object 445 appears above where Side 1 of the first physical marker 403 and Side 3 of the second physical marker 405 face each other. In some embodiments, the fourth virtual object 445 may appear directly on top of the first physical marker 403, which the fourth virtual object 445 is not associated with, or on top of the second physical marker 405.

Figure 4E:
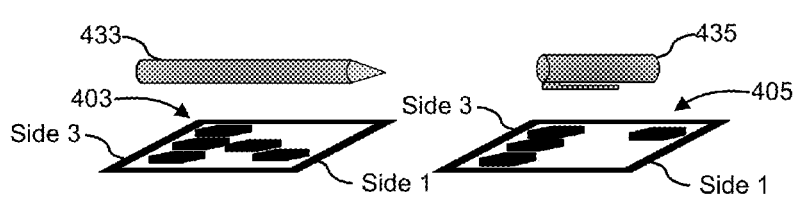

In FIG. 4E, the first physical marker 403 stays in the same position as the first physical marker 403 was in FIGS. 4C and 4D. However, the second physical marker 405 is rotated 180 degrees from the position that the second physical marker 405 is in FIGS. 4C and 4D so that Side 3 of the second physical marker 405 is now facing Side 1 of the first physical marker 403. The second virtual object 435 is rotated 180 degrees along with the rotation of the second physical marker 405. Consequently, the opening of the pen cap (i.e., the second virtual object 435) is now facing away from the tip of the pen (i.e., the first virtual object 433). Thus, images of the first virtual object 433, which appears on top of the first physical marker 403, and the second virtual object 435, which is rotated 180 degrees and appears on top of the second physical marker 405, as illustrated in FIG. 4E are displayed on an image-display device worn by the observer.

Figure 4F:
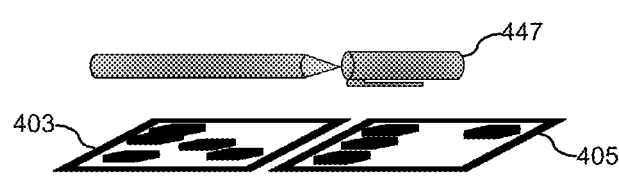

In FIG. 4F, an interaction between the first physical marker 403 and the second physical marker 405 is detected when the first physical marker 403 and the second physical marker 405 are placed within a predetermined distance (e.g., 0.5 centimeter) of each other for a predetermined period of time (e.g., 0.4 seconds). The orientations of the first physical marker 403 and the second physical marker 405 are also determined. The system may further determine whether the interaction is valid based on the orientations of the marker. The validity of the interactions may be prescribed by the observer or an administrator. For example, in the embodiment illustrated in FIG. 4F, the system determines that the interaction of the first physical marker 403 and the second physical marker 405 is not valid based on the orientation. In the view of the observer, the pen cap (i.e., the second virtual object 435) is facing away from the pen (i.e., the first virtual object 433), and, thus, the pen cap cannot be placed on the pen. In response to the invalidity of the interaction, the system may create a fifth virtual object 447 which illustrates the tip of the pen and the end of the pen cap touching each other, but the pen cap is not attached to the pen. Further, in some embodiments, instead of creating and displaying a virtual object, the system may alert the observer using a visual alert, audible alert, haptic alert (e.g., vibration), or any combination of the aforementioned alerts. Yet, in some other embodiments, the system may be configured to take no action when an invalid interaction is detected.

FIGS. 5A-E illustrate example embodiments of displaying a virtual object. In FIG. 5A, a first virtual object 533 (i.e., a girl) is associated with a first physical marker 503, a second virtual object 535 (i.e., a boy) is associated with a second physical marker 505, and a third virtual object 537 (i.e., a car) is associated with a third physical marker 507.

In FIG. 5B, the second physical marker 505 is placed on top of the third physical marker 507 so that the second physical marker 505 obstructs a part of the third physical marker 507. When the second physical marker 505 is placed above the third physical marker 507 for a predetermined period of time (e.g., 1 second), the system detects an interaction between the second physical marker 505 and the third physical marker 507. After an interaction is detected, the system replaces second virtual object 535 and third virtual object 537 with a fourth virtual object 545 where the boy is seated in the front seat of the car.

In FIG. 5C, the first physical marker 503 is placed on top of the second physical marker 505, which has already been placed on top of the third physical marker 507 in FIG. 5B, so that the first physical marker 503 obstructs a part of the second physical marker 505. When the first physical marker 503 is placed on top of the second physical marker 505 for a predetermined period of time (e.g., 0.8 seconds), the system detects an interaction between the first physical marker 503 and the second physical marker 505. After an interaction is detected, the system replaces fourth virtual object 545 with fifth virtual object 543 where a girl is seated in the front seat of the car and the boy is now seated in the rear seat of the car.

In FIG. 5D, the second physical marker 505 is taken out from the stack of the physical markers in FIG. 5C (i.e., the first physical marker 503 on top of the second physical marker 505, which is on top of the third physical marker 507) and placed on top of the first physical marker 503. Consequently, instead of the first physical marker 503 being on the top, the second physical marker 505 is now on the top (i.e., the second physical marker 505 on top of the first physical marker 503, which is on top of the third physical marker 507). When the second physical marker 505 is placed on top of the first physical marker 503, which is placed on top of the third physical marker 507, for a predetermined period of time (e.g., 0.8 seconds), the system detects an interaction between the second physical marker 505 and the first physical marker 503. After an interaction is detected, the system creates a sixth virtual object 544 where the boy is seated in the front seat of the car and the girl is seated in the rear seat of the car instead of the fifth virtual object 543, where the girl is seated in the front seat of the car and the boy is seated in the rear seat of the car.

In the embodiments illustrated in FIGS. 5A-D, the system recognizes the order in which the physical markers were placed on top one another. Thus, the virtual object that is associated with the physical marker on the top was seated in the front seat of the car and the virtual object that was associated with the physical marker that was second from the top (e.g., the physical marker that partially covered by the top physical marker) was seated in the rear seat of the car.

FIGS. 6A-C illustrate example embodiments of displaying a virtual object. In FIGS. 6A-C, a first virtual object 633 (i.e., a girl) is associated with a first physical marker 603, a second virtual object 635 (i.e., a boy) is associated with a second physical marker 605, and a third virtual object 637 (i.e., a car) is associated with a third physical marker 607. In these embodiments, the positions of the first physical marker 603, the second physical marker 605, and the third physical marker 607 are tracked based on the images of the physical scene captured by the tracking cameras.

In Stage 1A of FIG. 6A, the second physical marker 605 is moved to the direction indicated by the arrow (i.e. the second physical marker 605 approaches the third physical marker 607 from the right hand side). The system detects that the second physical marker 605 is approaching the third physical marker 607 by calculating the absolute distance between the second physical marker 605 and the third physical marker 607. As the orientations of the physical markers are known, the system also determines that Side 1 of second physical marker 605 is approaching Side 3 of third physical marker 607. In some embodiments, the system further detects the direction from which the second physical marker 605 approaches the third physical marker 607 by calculating the movement of the second physical marker 605 with respect to the third physical marker 607 from the coordinates of the second physical marker 605 and the third physical marker 607.

In Stage 2A of FIG. 6A, the system detects an interaction between the second physical marker 605 and the third physical marker 607 when the second physical marker 605 obstructs at least a part of the third physical marker 607 for a predetermined period of time (e.g., 1.8 seconds). Further, the system determines the direction from which the physical marker 605 approached the third physical marker 607. Based on the overlapping interaction of the second virtual object 635 approaching from the driver's side of third virtual object 637, the system generates fourth virtual object 645A, which illustrates the boy seated in the driver's seat of the car. Further, the fourth virtual object 645A is associated with the second physical marker 605. The images of the second virtual object 635 and the third virtual object 637 are replaced by the images of the fourth virtual object 645A. Displaying of the images of the first virtual object 633 is maintained. Thus, the observer sees images of the first virtual object 633 and the fourth virtual object 645A via the display device of an image-display device.

Further, in Stage 2A of FIG. 6A, the first physical marker 603 is moved towards the second physical marker 605 and the third physical marker 607 which are in a stack (e.g., the second physical marker 605 is placed on top of and hides third physical marker 607). For example, the system determines that the first physical marker 603 is approaching the stack of the second physical marker 605 and the third physical marker 607 by calculating the absolute distance between the first physical marker 603 and the stack (i.e., the stack of the second physical marker 605 and the third physical marker 607 that is represented by the second physical marker 605).

In Stage 3A of FIG. 6A, the system detects an interaction between the first physical marker 603 and the stack of the second physical marker 605 and the third physical marker 607. When the system detects the interaction, the system creates a fifth virtual object 643A which illustrates a boy seated in the driver's seat and a girl seated in the passenger's seat of the car. The fifth virtual object 643A is then associated with the first physical marker 603 which is now on the top of the stack of the first physical marker 603, the second physical marker 605, and the third physical marker 607. The system stops displaying the images of the first virtual object 633 and the fourth virtual object 645A and starts displaying images of the fifth virtual object 643A over the first physical marker 603.

In FIG. 6B, in Stage 1B the second physical marker 605 is moved to the direction indicated by the arrow (i.e. the second physical marker 605 approaches the third physical marker 607 from the left hand side). The system detects that the second physical marker 605 is approaching the third physical marker 607 by calculating the absolute distance between the second physical marker 605 and the third physical marker 607. As the orientation of the physical markers is known, the system also determines that Side 3 of second physical marker 605 is approaching Side 1 of third physical marker 607. In some embodiments, the system further detects the direction from which the second physical marker 605 approaches the third physical marker 607 by calculating the movement of the second physical marker 605 with respect to the third physical marker 607 from the coordinates of the second physical marker 605 and the third physical marker 607.

In Stage 2B of FIG. 6B, the system detects an interaction between the second physical marker 605 and the third physical marker 607 when the second physical marker 605 obstructs at least a part of the third physical marker 607 for a predetermined period of time (e.g., 1.8 seconds). Further, the system determines that the second physical marker 605 approached the third physical marker 607 from the passenger side of the car (i.e., the third virtual object 637), and thus the system generates a sixth virtual object 645B, wherein the sixth virtual object 645B illustrates the boy seated in the passenger's seat of the car. Further, the sixth virtual object 645B is associated with the second physical marker 605. The images of the second virtual object 635 and the third virtual object 637 are replaced by the image of the sixth virtual object 645B. The displaying of the image of the first virtual object 633 is maintained. Thus, the observer sees images of the first virtual object 633 and the sixth virtual object 645B via the display device of an image-display device.

Further, in Stage 2B of FIG. 6B, the first physical marker 603 is moved towards the second physical marker 605 and the third physical marker 607, which are in a stack (e.g., the second physical marker 605 completely covers the third physical marker 607). For example, the system determines that the first physical marker 603 is approaching the stack of the second physical marker 605 and the third physical marker 607 by calculating the absolute distance between the first physical marker 603 and the stack (i.e., the stack of the second physical marker 605 and the third physical marker 607 represented by second physical marker 605).

In Stage 3B of FIG. 6B, the system detects an interaction between the first physical marker 603 and the stack of the second physical marker 605 and the third physical marker 607. When the system detects the interaction, the system creates a seventh virtual object 643B, which illustrates a boy seated in the driver's seat and a girl seated in the passenger's seat of the car. The seventh virtual object 643B is then associated with the first physical marker 603, which is now on the top of the stack of the second physical marker 605 and the third physical marker 607. The system stops displaying the images of the first virtual object 633 and the sixth virtual object 645B and starts displaying images of the seventh virtual object 643B over the first physical marker 603.

Moving on to FIG. 6C, in Stage 1C, the first physical marker 603 is moved in the direction indicated by the arrow (i.e., the first physical marker 603 approaches the second physical marker 605 from the left hand side of the second physical marker 605). The system detects that the first physical marker 603 is approaching the second physical marker 605 by calculating the absolute distance between the second physical marker 605 and the third physical marker 607. As the orientations of the physical markers are known, the system also determines that Side 3 of first physical marker 603 is approaching Side 1 of second physical marker 605. In some other embodiments, the system may further detect the direction from which the first physical marker 603 approaches the second physical marker 605 by calculating the movement of the first physical marker 603 with respect to the second physical marker 605 from the coordinates of the first physical marker 603 and the second physical marker 605.

In Stage 2C of FIG. 6C, the system detects an interaction between the first physical marker 603 and the second physical marker 605 when the first physical marker 603 obstructs at least a part of the second physical marker 605 for a predetermined period of time (e.g., 1.8 seconds). Further, the system determines the direction from which the first physical marker 603 approached the second physical marker 605, and thus the system generates eighth virtual object 643C, in which the girl's left hand is holding the boy's right hand. Further, the eighth virtual object 643C is associated with the first physical marker 603. The images of the first virtual object 633 and the second virtual object 635 are replaced by the image of the eighth virtual object 643C. Displaying of the image of the third virtual object 637 is maintained. Thus, the observer sees images of the third virtual object 637 and the eighth virtual object 643C via the display device of an image-display device.

Further, in Stage 2C of FIG. 6C, the stack of the first physical marker 603 and the second physical marker 605 is moved towards the third physical marker 607. For example, the system determines that the stack of the first physical marker 603 and the second physical marker 605 is approaching the third physical marker 607 by calculating the absolute distance between the stack, which is represented by the first physical marker 603, and the third physical marker 607.

In Stage 3C of FIG. 6C, the system detects an interaction between the third physical marker 607 and the stack of the first physical marker 603 and the second physical marker 605. When the system detects the interaction, the system creates a ninth virtual object 644C, which illustrates a boy seated in the driver's seat and a girl seated in the passenger's seat of the car. The ninth virtual object 644C is now associated with the first physical marker 603, with which the eighth virtual object 643C had previously been associated. The system stops displaying the images of the third virtual object 637 and the eighth virtual object 643C and starts displaying images of the ninth virtual object 644C over the first physical marker 603.

Figure 7A:
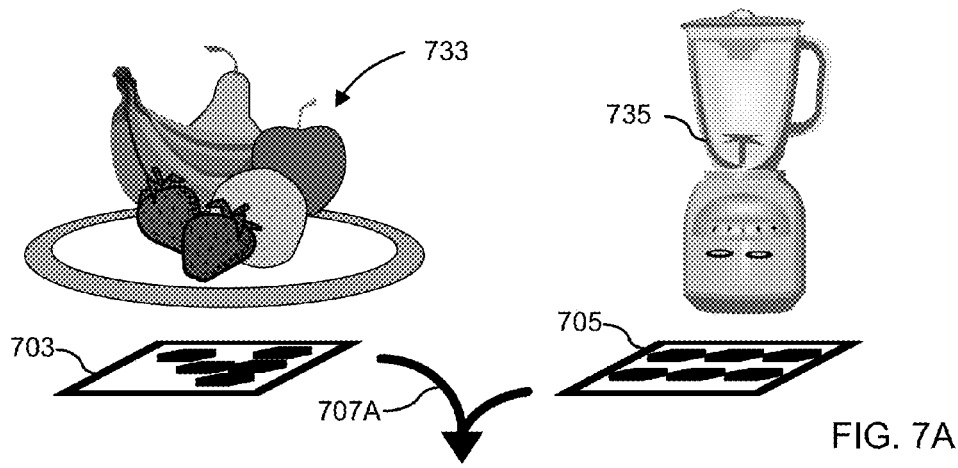
FIGS. 7A-E illustrate example embodiments of displaying a virtual object.

FIGS. 7A-E illustrate example embodiments of displaying a virtual object. In FIG. 7A, a first virtual object 733 (i.e., a dish full of fruits) is associated with a first physical marker 703 and a second virtual object 735 (i.e., an empty blender) is associated with a second physical marker 705. The observer of an image-display device sees at least the images of the first virtual object 733 and the second virtual object 735. Then, the first physical marker 703 and the second physical marker 705 are moved closer to each other as shown by an arrow 707A.

Figure 7B:
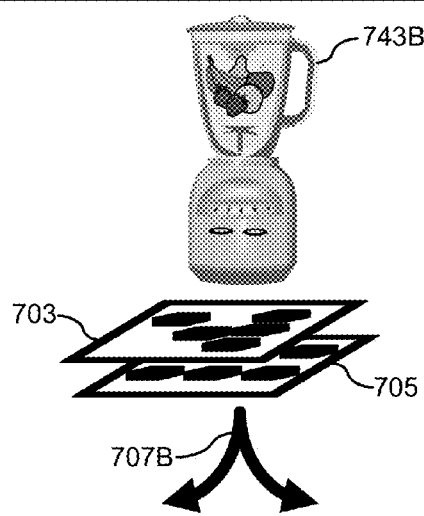

In FIG. 7B, the first physical marker 703 is overlaid on the second physical marker 705. When the first physical marker 703 is overlaid on the second physical marker 705 for a predetermined period of time (e.g., 0.2 seconds), the system detects an interaction between the first physical marker 703 and the second physical marker 705. When the system detects an interaction for the first time, a third virtual object 743B (i.e., fruits in the blender) is created, and the third virtual object 743B is associated with the first physical marker 703. The displaying of the images of the first virtual object 733 and the second virtual object 735 is stopped, and images of the third virtual object 743B are sent to and displayed by the image-display device. Then, the first physical marker 703 and the second physical marker 705 are moved away from each other, as shown by an arrow 707B.

Figure 7C:
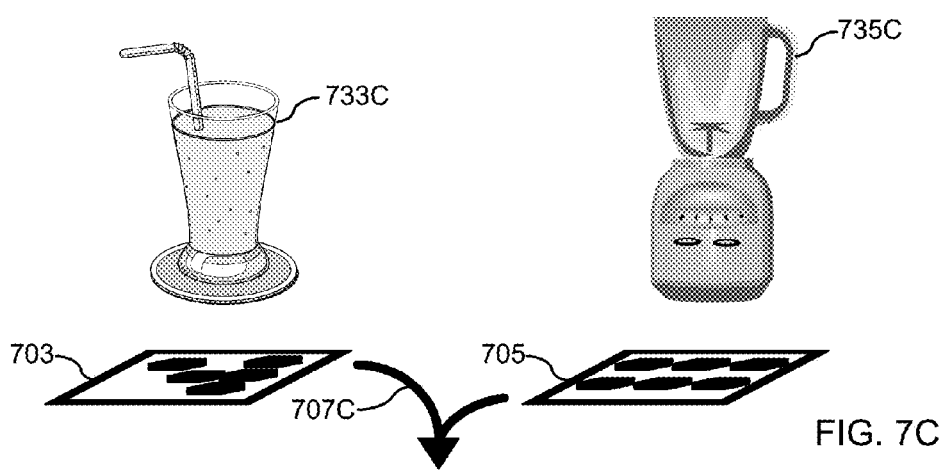

In FIG. 7C, the first physical marker 703 and the second physical marker 705 are separated (e.g., the first physical marker 703 moves away from the second physical marker 705). When the system detects the separation between the first physical marker 703 and the second physical marker 705 for the first time, the system generates a fourth virtual object 733C (i.e., a smoothie in a glass with a straw), which is associated with first physical marker 703, and a fifth virtual object 735C (i.e., an empty dirty blender), which is associated with second physical marker 705. The displaying of the image of the third virtual object 743B is stopped, and the images of the fourth virtual object 733C and the fifth virtual object 735C are sent to and displayed by the image-display device. Then, the first physical marker 703 and the second physical marker 705 are brought closer to each other, as shown by an arrow 707C.

Figure 7D:
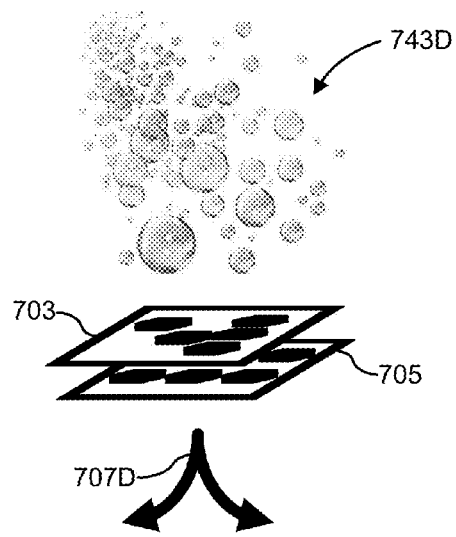

In FIG. 7D, the first physical marker 703 with which the fourth virtual object 733C is associated and the second physical marker 705 with which the fifth virtual object 735C is associated are moved towards each other. When the first physical marker 703 is overlaid on the second physical marker 705 for a predetermined period of time (e.g., 0.9 seconds), the system detects an interaction between the first physical marker 703 and the second physical marker 705. As this is the second time for the specific interaction to occur, the system creates a sixth virtual object 743D (i.e., soap bubbles), where the sixth virtual object 743D is associated with the first physical marker 703, stops sending the images of the fourth virtual object 733C and the fifth virtual object 735C, and starts sending images of the sixth virtual object 743D. Then, the first physical marker 703 and the second physical marker 705 are moved away from each other, as shown by an arrow 707D.

Figure 7E:
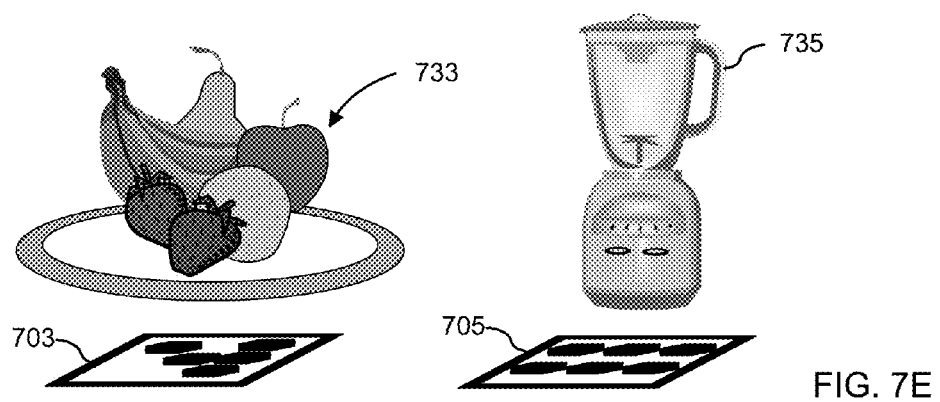

In FIG. 7E, the first physical marker 703, with which the sixth virtual object 743D is associated, and the second physical marker 705, which was placed underneath the first physical marker 703, are moved away from each other. When the system detects the separation of the physical marker for the second time, the system associates the first virtual object 733 with the first physical marker 703 and associates the second virtual object 735 with the second physical marker 705. In response to the association, the system stops sending the images of the sixth virtual object 743D and starts sending images of the first virtual object 733 and the second virtual object 735.

In this embodiment, the number of the interactions between the first physical marker 703 and the second physical marker 705 is recorded. If the interaction count is odd, a third virtual object 743B (i.e., fruits in the blender) is associated with the first physical marker 703 and is displayed on the image-display device. Otherwise, if the interaction count is even, the sixth virtual object 743D is associated with the first physical marker 703 and is displayed on the image-display device. In a different embodiment, state can be tracked with a Boolean flag, which is initially set to false, but is toggled to true when the third virtual object 743B appears, and is toggled back to false when the sixth virtual object appears.

Further, in this embodiment, the number of times the first physical marker 703 and the second physical marker 705 are separated is recorded. If the separation count is even, the fourth virtual object 733C is associated with the first physical marker 703 and the fifth virtual object 735C is associated with the second physical marker 705. However, if the separation count is odd, the first virtual object 733 is associated with the first physical marker 703 and the second physical marker 735 is associated with the second physical marker 705. In the different embodiment described above, if the Boolean flag is true, the fourth virtual object 733*c* is associated with the first physical marker 703 and the fifth virtual object 735C is associated with the second physical marker 705.

Figure 8:
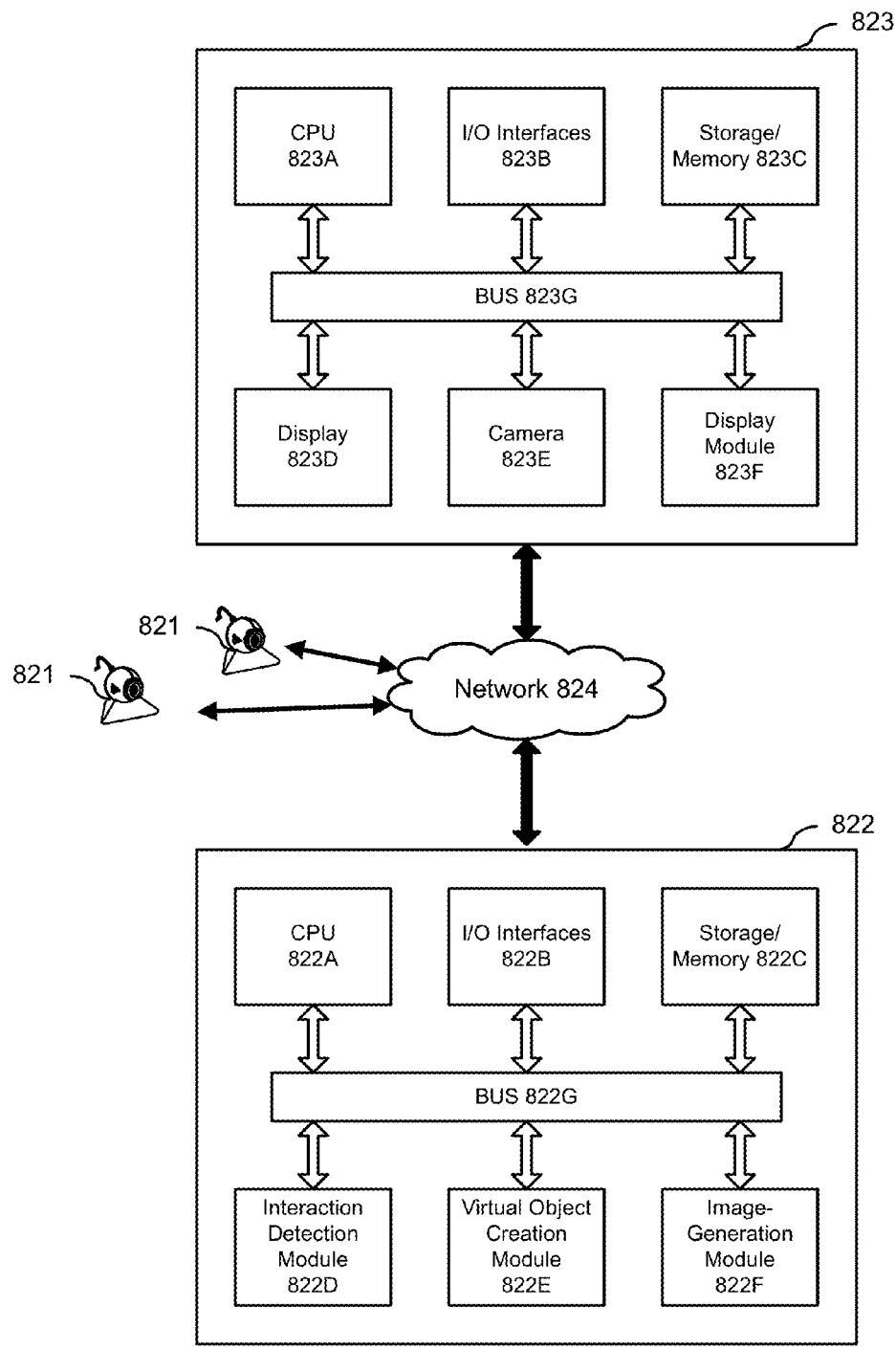
FIG. 8 illustrates an example embodiment of a system for a virtual object.

FIG. 8 illustrates an example embodiment of a system for displaying a virtual object. The system includes one or more tracking cameras 821, an image-enhancing device 822, and an image-display device 823. The entities in the system communicate via a network 824. The network 824 provides high-bandwidth transmissions of data among the entities in the system.

The image-enhancing device 822 includes one or more processors (CPUs) 822A, one or more I/O interfaces 822B, and storage/memory 822C. The CPUs 822A include one or more central processing units, which include microprocessors (e.g., a single core microprocessor, a multi-core microprocessor) or other circuits, and the CPUs 822A are configured to read and perform computer-executable instructions, such as instructions in storage, in memory, or in a module. The I/O interfaces 822B include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network (either wired or wireless).

The storage/memory 822C includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 822C can store computer-readable data or computer-executable instructions. The components of the image-enhancing device 822 communicate via a bus 822G.

The image-enhancing device 822 also includes an interaction detection module 822D, a virtual object creation module 822E, and an image-generation module 822F. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules.

The interaction detection module 822D includes instructions that, when executed, or circuits that, when activated, cause the image-enhancing device 822 to obtain one or more images from the tracking cameras 821 and one or more cameras 823E of the image-display device 823, track the positions and orientations of physical markers in the one or more images, and detect interactions between the physical markers. The virtual object creation module 822E includes instructions that, when executed, or circuits that, when activated, cause the image-enhancing device 822 to create virtual objects based on the interactions of the physical markers and associate the created virtual objects with the physical markers. The image-generation module 822F includes instructions that, when executed, or circuits that, when activated, cause the image-enhancing device 822 to generate images of the enhanced scene and images of the further-enhanced scene. The images may be based on the created virtual objects, which are associated with the physical markers.

The image-display device 823 includes one or more CPUs 823A, I/O interfaces 823B, storage/memory 823C, the one or more displays 823D, one or more cameras 823E, and a display module 823F. The display module 823F includes instructions that, when executed, or circuits that, when activated, cause the object-interface device 823 to obtain images of a physical scene by means of the cameras 823E, receive images of an enhanced scene or a further-enhanced scene from the image-enhancing device 822, and display images of the enhanced scene or the further-enhanced scene on the display 823D.

The above-described devices and systems can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A system for displaying a virtual object, the system comprising:
   one or more non-transitory computer-readable media; and
   one or more processors that are coupled to the one or more computer-readable media and that are configured to cause the system to
   obtain images of a physical scene that includes a first marker and a second marker, wherein the first marker and the second marker are physical markers;
   generate images of an enhanced scene that show a first virtual object with the first marker and that show a second virtual object with the second marker;
   track a position of the first marker and a position of the second marker in the images of the physical scene;
   detect an interaction between the first marker and the second marker based on the tracked position of the first marker and the tracked position of the second marker, wherein the interaction is detected when the position of the first marker is within a predetermined distance of the position of the second marker;
   in response to detecting the interaction, select another virtual object based on a topmost marker of the first marker and the second marker when one of the first marker and the second marker at least partially overlaps the other, wherein the other virtual object that is selected is a third virtual object if the first marker is the topmost marker, wherein the other virtual object that is selected is a fourth virtual object if the second marker is the topmost marker, and wherein the first virtual object, the second virtual object, the third virtual object, and the fourth virtual object are different from each other; and
   generate revised images of the enhanced scene that replace both the first virtual object and the second virtual object with the other virtual object,
   wherein the third virtual object is a first combination of the first virtual object and the second virtual object, and
   wherein the fourth virtual object is a second combination of the first virtual object and the second virtual object.

2. The system according to claim 1,
wherein a distance between the position of the first marker and the position of the second marker is calibrated such that the distance is zero only if the first marker completely conceals the second marker or the second marker completely conceals the first marker, and
wherein the predetermined distance is less than a width of the first marker and less than a width of the second marker.

3. The system according to claim 1, wherein the topmost marker completely conceals any underlying markers.

4. The system of claim 1, wherein the interaction is detected when either the first marker obstructs at least a part of the second marker for a predetermined period of time or the second marker obstructs at least a part of the first marker for the predetermined period of time.

5. A system for displaying a virtual object, the system comprising:
one or more non-transitory computer-readable media; and
one or more processors that are coupled to the one or more computer-readable media and that are configured to cause the system to
obtain images of a physical scene that includes a first marker and a second marker, wherein the first marker and the second marker are physical markers;
generate images of an enhanced scene that show a first virtual object with the first marker and that show a second virtual object with the second marker;
track a position of the first marker and a position of the second marker in the images of the physical scene;
detect an interaction between the first marker and the second marker based on the tracked position of the first marker and the tracked position of the second marker, wherein the interaction is detected when the position of the first marker is within a predetermined distance of the position of the second marker;
in response to detecting the interaction, select another virtual object based on a most-recently-moved marker, as indicated by the tracked position of the first marker and the tracked position of the second marker, wherein the other virtual object that is selected is a third virtual object if the first marker is the most-recently-moved marker, wherein the other virtual object that is selected is a fourth virtual object if the second marker is the most-recently-moved marker, and wherein the first virtual object, the second virtual object, the third virtual object, and the fourth virtual object are different from each other; and
generate revised images of the enhanced scene that replace both the first virtual object and the second virtual object with the other virtual object,
wherein the third virtual object is a first combination of the first virtual object and the second virtual object, and
wherein the fourth virtual object is a second combination of the first virtual object and the second virtual object.

6. The system according to claim 5,
wherein the physical scene further includes a third marker, wherein the third marker is a physical marker,
wherein the images of the enhanced scene further show a third virtual object with the third marker, and
wherein the one or more processors are further configured to cause the system to
track a position and orientation of the third marker in the images of the physical scene,
detect a second interaction between the first marker, the second marker, and the third marker when the position of the first marker, the position of the second marker, and the position of the third marker are within the predetermined distance of each other,
select the other virtual object based on the most-recently-moved marker, as indicated by the tracked position of the first marker, the tracked position of the second marker, and the tracked position of the third marker, wherein the other virtual object that is selected is a fifth virtual object if the third marker is the most-recently-moved marker, and
generate revised images of the enhanced scene that replace the first virtual object, the second virtual object, and the third virtual object with the other virtual object.

7. The system according to claim 5,
wherein the physical scene further includes a third marker, wherein the third marker is a physical marker,
wherein the images of the enhanced scene further show a third virtual object with the third marker, and
wherein the one or more processors are further configured to cause the system to
track a position and orientation of the third marker in the images of the physical scene;
detect a second interaction between the first marker, the second marker, and the third marker when the position of the first marker, the position of the second marker, and the position of the third marker are within the predetermined distance of each other;
select the other virtual object based on the most-recently-moved marker, as indicated by the tracked position of the first marker, the tracked position of the second marker, and the tracked position of the third marker, and based on a next-most-recently-moved marker that indicates which of the first marker, the second marker, and the third marker is the next-most-recently moved marker, as indicated by the tracked position of the first marker, the tracked position of the second marker, and the tracked position of the third marker, wherein a fifth virtual object is selected as the other virtual object if the third marker is the most-recently-moved marker and the first marker is the next-most-recently-moved marker, and wherein a sixth virtual object is selected as the other virtual object if the third marker is the most-recently-moved marker and the second marker is the next-most-recently-moved marker; and
generate revised images of the enhanced scene that replace the first virtual object, the second virtual object, and the third virtual object with the other virtual object.

8. One or more non-transitory computer-readable media storing computer-executable instructions that, when executed by one or more computing devices, cause the one or more computing devices to perform operations comprising:
obtaining images of a physical scene that includes a first marker and a second marker, wherein the first marker and the second marker are physical markers;
generating images of an enhanced scene that show a first virtual object with the first marker and that show a second virtual object with the second marker;
tracking a position of the first marker and a position of the second marker in the images of the physical scene;
detecting an interaction between the first marker and the second marker based on the tracked position of the first marker and the tracked position of the second marker, wherein the interaction is detected when the position of the first marker is within a predetermined distance of the position of the second marker;

in response to detecting the interaction, selecting another virtual object based on a topmost marker when one of the first marker and the second marker at least partially overlaps the other, wherein a third virtual object is selected as the other virtual object if the first marker is the topmost marker, wherein a fourth virtual object is selected as the other virtual object if the second marker is the topmost marker, and wherein the first virtual object, the second virtual object, the third virtual object, and the fourth virtual object are different from each other; and generating revised images of the enhanced scene that replace both the first virtual object and the second virtual object with the other virtual object, wherein the third virtual object is a first combination of the first virtual object and the second virtual object, and wherein the fourth virtual object is a second combination of the first virtual object and the second virtual object.

9. The one or more computer-readable storage media according to claim 8, wherein the topmost marker completely overlaps any underlying markers.

10. The one or more computer-readable storage media according to claim 8, wherein a distance between the position of the first marker and the position of the second marker is calibrated such that the distance is zero only if the first marker completely conceals the second marker or the second marker completely conceals the first marker, and the predetermined distance is less than a width of the first marker.

11. One or more non-transitory computer-readable media storing instructions that, when executed by one or more computing devices, cause the one or more computing devices to perform operations comprising:

obtaining images of a physical scene that includes a first marker and a second marker, wherein the first marker and the second marker are physical markers;

generating images of an enhanced scene that show a first virtual object with the first marker and that show a second virtual object with the second marker;

tracking a position of the first marker and a position of the second marker in the images of the physical scene;

detecting an interaction between the first marker and the second marker based on the tracked position of the first marker and the tracked position of the second marker, wherein the interaction is detected when the position of the first marker is within a predetermined distance of the position of the second marker;

in response to detecting the interaction, selecting another virtual object based on a most-recently-moved marker, wherein a third virtual object is selected as the other virtual object if the first marker is the most-recently-moved marker, wherein a fourth virtual object is selected as the other virtual object if the second marker is the most-recently-moved marker, and wherein the first virtual object, the second virtual object, the third virtual object, and the fourth virtual object are different from each other; and generating revised images of the enhanced scene that replace both the first virtual object and the second virtual object with the other virtual object, wherein the third virtual object is a first combination of the first virtual object and the second virtual object, and wherein the fourth virtual object is a second combination of the first virtual object and the second virtual object.

12. A method comprising:

obtaining images of a physical scene that includes a first marker and a second marker, wherein the first marker and the second marker are physical markers, and wherein the images were captured by an image capturing device;

generating images of an enhanced scene that show a first virtual object with the first marker and that show a second virtual object with the second marker;

tracking a position of the first marker and a position of the second marker in the images of the physical scene;

detecting an interaction between the first marker and the second marker based on the tracked position of the first marker and the tracked position of the second marker, wherein the interaction is detected when the first marker at least partially overlaps the second marker or when the second marker at least partially overlaps the first marker;

in response to detecting the interaction, selecting another virtual object based on a topmost marker of the first marker and the second marker, wherein a third virtual object is selected as the other virtual object if the first marker is the topmost marker, wherein a fourth virtual object is selected as the other virtual object if the second marker is the topmost marker, and wherein the first virtual object, the second virtual object, the third virtual object, and the fourth virtual object are different from each other; and generating revised images of the enhanced scene that replace both the first virtual object and the second virtual object with the other virtual object, wherein the third virtual object is a first combination of the first virtual object and the second virtual object, and wherein the fourth virtual object is a second combination of the first virtual object and the second virtual object.

13. A method comprising:

obtaining images of a physical scene that includes a first marker and a second marker, wherein the first marker and the second marker are physical markers, and wherein the images were captured by an image capturing device;

generating images of an enhanced scene that show a first virtual object with the first marker and that show a second virtual object with the second marker;

tracking a position of the first marker and a position of the second marker in the images of the physical scene;

detecting an interaction between the first marker and the second marker based on the tracked position of the first marker and the tracked position of the second marker, wherein the interaction is detected when the position of the first marker is within a predetermined distance of the position of the second marker;

in response to detecting the interaction, selecting another virtual object based on a most-recently-moved marker, wherein a third virtual object is selected as the other virtual object if the first marker is the most-recently-moved marker, wherein a fourth virtual object is selected as the other virtual object if the second marker is the most-recently-moved marker, and wherein the first virtual object, the second virtual object, the third virtual object, and the fourth virtual object are different from each other; and generating revised images of the enhanced scene that replace both the first virtual object and the second virtual object with the other virtual object, wherein the third virtual object is a first combination of the first virtual object and the second virtual object, and wherein the fourth virtual object is a second combination of the first virtual object and the second virtual object.

14. The method of claim 13,
wherein the physical scene further includes a third marker, wherein the third marker is a physical marker,
wherein the images of the enhanced scene further show a third virtual object with the third marker, and
wherein the method further comprises:
- tracking a position and orientation of the third marker in the images of the physical scene,
- detecting a second interaction between the first marker, the second marker, and the third marker when the position of the first marker, the position of the second marker, and the position of the third marker are within the predetermined distance of each other,
- selecting the other virtual object based on the most-recently-moved marker and based on a next-most-recently-moved marker, wherein a fifth virtual object is selected as the other virtual object if the third marker is the most-recently-moved marker and the first marker is the next-most-recently-moved marker, and wherein a sixth virtual object is selected as the other virtual object if the third marker is the most-recently-moved marker and the second marker is the next-most-recently-moved marker, and
- generating revised images of the enhanced scene that replace the first virtual object, the second virtual object, and the third virtual object with the other virtual object.

* * * * *